SADAYASU OTA
INVENTOR

United States Patent Office 3,384,344
Patented May 21, 1968

3,384,344
GAS BEARING DEVICE FOR DENTAL
HANDPIECES
Sadayasu Ota, 19 Momoyama Tsutsui,
Fushimi-ku, Kyoto, Japan
Filed May 5, 1967, Ser. No. 636,518
Claims priority, application Japan, Jan. 25, 1967,
42/4,967
1 Claim. (Cl. 253—2)

ABSTRACT OF THE DISCLOSURE

This disclosure relates to a gas bearing device, sometimes referred to as a pneumatic bearing or air bearing device, for dental handpieces incorporating an air turbine driven by compressed air entering the device through a supply passage and being jetted against turbine blades coupled to the shaft and directed through additional passages to provide an air cushion in spaces around the shaft before entering exhaust passages. The disclosed device includes an arrangement of two, three-way electromagnetic valves interposed between the compressed air source and the supply and exhaust passages and operable to connect the compressed air source to the exhaust passage for a predetermined period of time following switching of the supply passage from the compressed air source, so as to supply compressed air to the reverse side of the turbine blades and cause rapid termination of shaft rotation.

Background of the invention

In gas (or pneumatic) bearings for dental handpieces of the air turbine type, it is well known to jet compressed air onto the turbine blades provided on the rotary dental tool to rotate the tool and at the same time to supply compressed air into the space or gap between the tool holding shaft and the bearing surfaces so that the shaft floats in the air in the space as it is rotating. In order to begin or stop the rotation of the tool, the supply of compressed air may be simply commenced or terminated. Upon termination of the air supply, however, the rotating shaft cannot instantly stop but continues rotating due to inertia for a certain period of time, say, 12 to 15 seconds. During this inertial rotation, the turbine blades function as a fan so as to render the pressure in the bearing space negative with respect to the atmospheric pressure. As a result, outside air may well be inhaled into the bearing space. If the air contains dust or minute particles caused by the grinding, drilling or cutting of tooth material, they may well do harm to the bearing surfaces, thereby deteriorating bearing efficiency. Moreover, there is a danger that the dental tool rotating due to inertia may injure the human skin upon accidential contact therewith. Therefore, it is necessary to reduce such inertial rotation of the dental tool as much as possible. However, no devices positively directed to this end have ever been proposed to the best knowledge of the present inventor.

Accordingly, the primary object of the invention is to provide a gas pressure-fed bearing device for a dental handpiece of the air turbine type, wherein the inertial rotation of the dental tool holding shaft upon stoppage of the supply of compressed air is reduced to zero in a short period of time.

Another object of the invention is to provide such a bearing device as aforesaid, wherein the inertial rotation of the turbine blades upon stoppage of the supply of compressed air is substantially reduced, thereby preventing the pressure within the bearing space from becoming negative so as to inhale outside air thereinto.

Summary of the invention

The bearing device of the invention has a supply passage for jetting compressed air onto the front surfaces of the radial turbine blades provided on the dental tool holding shaft for rotation thereof, supply passages for supplying compressed air into the bearing space, and an exhaust passage open toward the rear surfaces of the turbine blades for discharging into the open air the compressed air that has helped rotate the turbine. The device is characterized by means operable to stop the rotation of the shaft by supplying compressed air through the exhaust passage to be jetted against the rear surfaces of the rotating turbine blades, thereby reducing the inertial rotation of the shaft, utilizing a special arrangement of electromagnetic valves coupled between the compressed air source and the supply and exhaust passages. The compressed air maintains the pressure within the bearing space higher than the atmospheric pressure, so that outside air will not be inhaled into the bearing space. The compressed air is then discharged into atmosphere through the supply passage.

More specifically, the invention provides a gas bearing device for a dental handpiece having a rotatable shaft for holding a dental tool for rotation therewith and a plurality of turbine blades provided on said shaft, including means for defining a gap around the outer circumferential surface of at least a portion of the shaft. A first passage means open at one end toward the front surfaces of the turbine blades is connectable at the other end alternatively to a source of compressed air and atmosphere, while a second passage means open at one end toward the rear surfaces of the turbine blades is connectable at the other end alternatively to the source of compressed air and atmosphere and a third passage means connects the gap around the shaft to the first and second passage means. A first three-way electromagnetic valve connected to the first passage means is operable in a first condition to connect the first passage means to the source of compressed air and in a second condition to connect the first passage means to atmosphere, while a second three-way electromagnetic valve connected to the second passage means is operable in a first condition to connect the second passage means to the source of compressed air and in a second condition to connect the second passage means to atmosphere. Means are included for switching the first and second valves between their respective first and second conditions and for effecting the first condition of the second valve for a predetermined period of time after the first valve has been switched from its first to its second condition.

The invention will be better understood from the following description with reference to the accompanying drawings.

Description of the preferred embodiment

Figure 1:
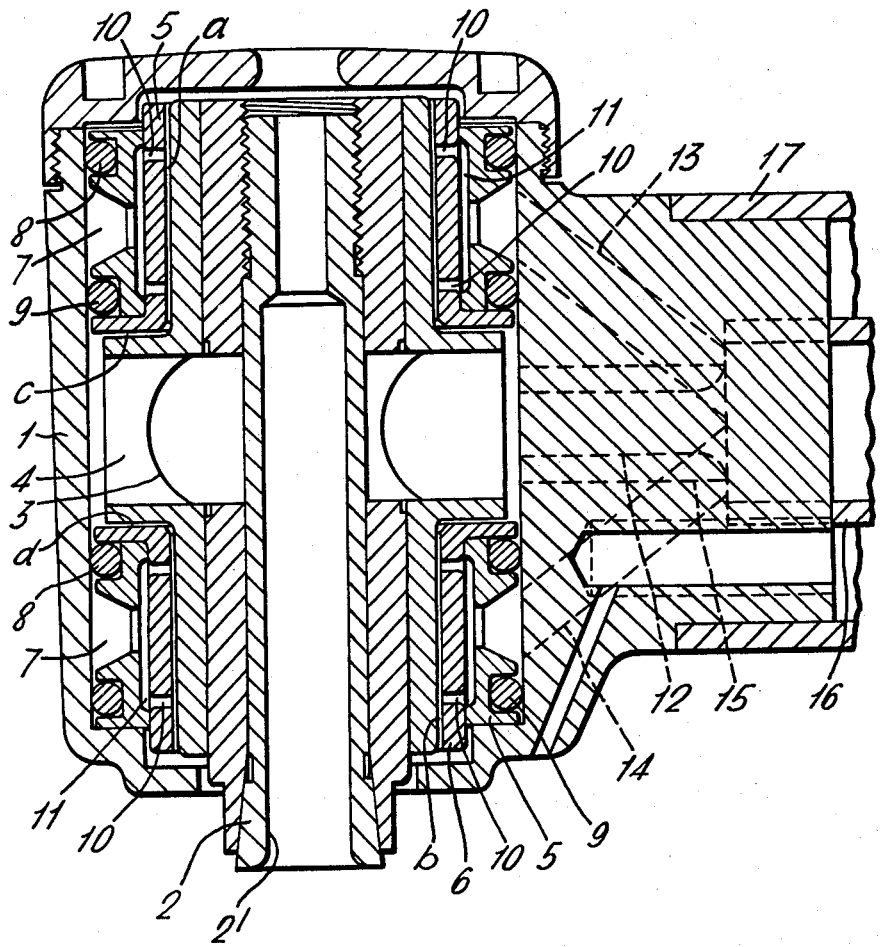
FIG. 1 is a longitudinal section of the bearing device of the invention.

Referring to FIG. 1, there is shown a housing 1, which encloses a rotatable shaft 2 having a turbine 4 comprising a plurality of radial blades 3. The shaft 2 is formed with an axial bore 2′ for a dental tool such as a drill (not shown) to be inserted thereinto for simultaneous rotation therewith. At the opposite sides of the turbine 4 there are provided a pair of bearing sleeves 5 and 6. Each bearing sleeve has an outer circumferential groove 7 and a pair of O-rings 8 and 9 in sealing contact with the inner lateral surface of the housing at the opposite sides of the groove 7. Each bearing sleeve is provided with a plurality of radially extending air inlet or supply passages 10, each of which has its inner end opening toward the bearing space or gap, *a*, *b* and its outer end communicating with the groove 7 through a passage 11. The housing 1 is formed with air supply passages 12, 13 and 14, and an air exhaust passage 15. The passages 12, 13 and 14 communicate with a conduit 16, while the passage 15 communicates with a passage formed between the outer surface of the conduit 16 and the inner surface of a conduit 17 through which the conduit 16 extends. The passage 12 opens toward the front surfaces of the turbine vanes 3, so that the compressed air jetted out of the passage 12 rotates the turbine 4. The exhaust passage 15 opens toward the rear surfaces of the turbine vanes, so that the compressed air that has hit the vanes is discharged through passages 15 and 17 out into atmosphere. The supply passages 13 and 14 communicate with the grooves 7 of the upper and lower bearing sleeves, so that the compressed air supplied through the passages 13 and 14 flows through the passages 10 into the bearings spaces *a* and *b*. As a result, the shaft 2 floats out of contact with the bearing surfaces of the sleeves 5 and 6 as it rotates. The air in the spaces *a* and *b* provides a radial bearing for the shaft.

A space *c* is formed between the upper surface of the turbine 4 and the opposed surface of the upper bearing sleeve 5, and a similar space *d* is also formed between the lower surface of the turbine and the opposed surface of the lower bearing sleeve 6. These spaces *c* and *d* communicaate with the spaces *a* and *b*, respectively, and also with the exhaust passage 15, so that the compressed air flows from the spaces *a* and *b* into the spaces *c* and *d*, thereby providing thrust bearings for the shaft as it rotates. The compressed air is finally discharged into atmosphere.

It will be seen that the compressed air supplied through the passages 12, 13 and 14 rotates the turbine and consequently the shaft 2, simultaneously providing a pneumatic bearing for the rotating shaft. If, in order to stop the rotation of the shaft, the air supply is simply stopped, the turbine will still rotate for some time due to inertia, thereby inhaling outside air into the spaces *a*, *b*, *c* and *d*, as previously mentioned. In accordance with the present invention, the exhaust passage 15 is temporarily changed to a supply passage, and at the same time supply passages are converted to exhaust passages communicating with the open air. Compressed air is then introduced through the exhaust passage 15 to be jetted against the rear surfaces of the turbine blades, thereby exercising a damping force thereon to stop the rotation of the turbine in a very short time. Even when shaft 2 rotates due to inertia for a short time, outside air will not be inhaled into the housing, since the compressed air supplied from the passage 15 will not render the inside pressure negative with respect to the atmospheric pressure. Once the shaft has stopped, further supply of compressed air will not cause the shaft to rotate in the opposite direction since the turbine blades will not receive enough torque for rotation and the air in the bearing spaces will not have a pressure enough to float the shaft.

Figure 2:
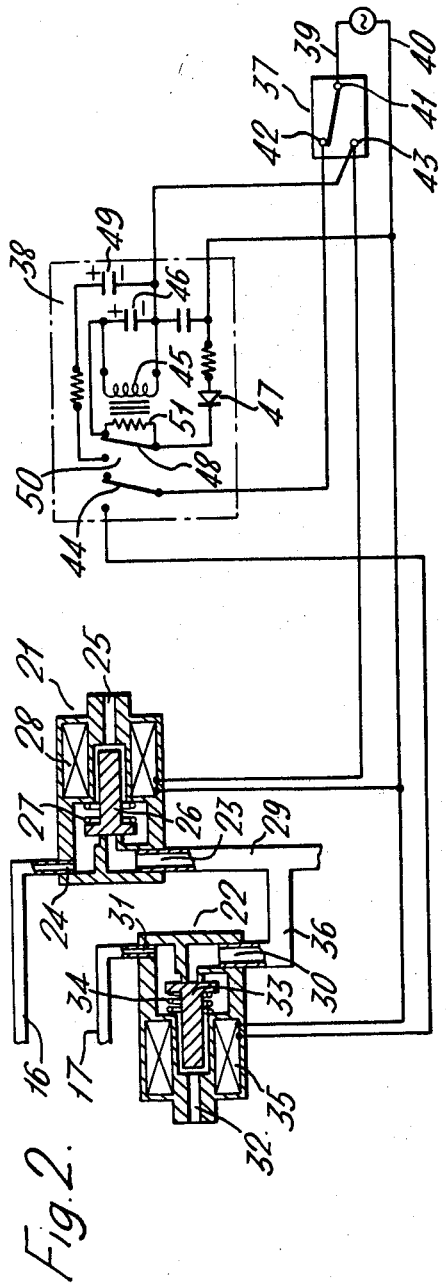
FIG. 2 is a diagram of an electrical circuit for controlling the rotation of the dental tool holding shaft shown in FIG. 1.

Turning to FIG. 2, the conduits 16 and 17 communicating with the supply and exhaust passages in FIG. 1, respectively, are connected to three-way electromagnetic valves 21 and 22, respectively. The valve 21 comprises three ports 23, 24 and 25, a valve plunger 26, a spring 27 and an electromagnetic coil 28. The port 23 is connected by a conduit 29 to a source of compressed air (not shown); the port 24, to the conduit 16; and the port 25, to atmosphere. The valve plunger 26 is urged by the spring 27 to normally close the port 23, while communicating the ports 24 and 25 at the same time. When the coil 28 is energized, however, the valve plunger 26 is pulled against the resiliency of the spring 27 to open the port 23, thereby communicating the ports 23 and 24 and closing the port 25 at the same time. The other electromagnetic valve 22 also comprises three ports 30, 31 and 32, a valve plunger 33, a spring 34 and an electromagnetic coil 35. The port 30 is connected through a conduit 36 to the conduit 29; the port 31 to the conduit 17; and the port 32 to the open air. The valve 33 is urged by the spring 34 to normally close the port 30, while communicating the ports 31 and 32 at the same time. When the coil 35 is energized, the valve 33 is pulled against the resiliency of the spring 34 so as to open the port 30, thereby communicating it with the port 31 and at the same time closing the port 32.

The energization of the coils 28 and 35 is controlled by means of a foot switch 37 and an open-circuit delay relay 38. The switch 37 is inserted in one of the two lines 39 and 40 connected to a source of electricity and has a movable contact arm 41 normally in contact with a contact 42. When the switch is stepped on, the arm 41 is switched over to a second contact 43. The coil 28 is connected between the contact 43 and the line 40. The relay 38 is so designed that its contact that has been closed upon energization is opened a predetermined period of time after deenergization, and comprises a normally open contact 44, an energizing coil 45, and a delaying condenser 46 connected across the coil 45. The coil 35 of the electromagnetic valve 22 is connected through the contacts 44 and 42 to the line 39. The coil 45 of the relay 38 is connected between the contact 43 and the line 40 through a rectifier 47 and a normally closed auxiliary contact 48. If necessary, an auxiliary delaying condenser 49 is connected across the coil 45. The condenser 49 is also connected across the condenser 46 through a normally open auxiliary contact 50. A resistor 51 is connected across the contact 48.

When the switch 37 is stepped on, the movable contact arm 41 is switched over to the contact 43, whereupon the coil 28 of the electromagnetic valve 21 is energized so that the valve 26 opens the port 23 to introduce compressed air from the conduit 29 into the conduit 16. As a result, the air rotates the shaft 2 and is then discharged through the conduit 17 and the port 32 into the open air. On the other hand, when the arm 41 of the switch 37 has contacted the contact 43, the coil 45 of the relay 38 is energized through the rectifier 47 and the closed contact 48, so that the contact 48 is opened while the contacts 50 and 44 are both closed. When the contact 48 has thus been opened, the coil 45 still remains energized through the resistor 51 and the condenser 46 is being charged in the polarity shown in the figure. At the same time the condenser 49 is also charged in the polarity shown in the figure through the now closed contact 50. Under this condition, when the step on the switch 37 is released, the contact arm 41 is restored back to the contact 42 by a spring (not shown), so that the coil 28 of the electromagnetic valve 21 is deenergized to restore the valve 26 to the illustrated original position, thereby communicating the conduit 16 through the port 25 to the open air. At the same time, the coil 35 of the other electromagnetic valve 22 is energized through the contact 44 then closed, so that the ports 30 and 31 are connected to introduce compressed air from the conduit 36 into the exhaust passage 17 to prevent the inertial rotation of the shaft 2 and at the same time maintain the interior of the housing 1 at a higher pressure level than atmosphere.

Even after the contact arm 41 has been restored, the coil 45 of the relay 38 remains energized by the discharge current from the condensers 46 and 49. When the discharge current has decreased to a certain level, the coil 45 is deenergized to open the contacts 44 and 50, closing the contact 48 at the same time, as shown in FIG. 2. Upon opening of the contact 44, the coil 35 is deenergized to restore the valve 33 to the illustrated position. This means that until the restoration of the valve 33, or in other words for the delay time provided by the relay 38, compressed air is being supplied through the exhaust passage 17.

Figure 3:
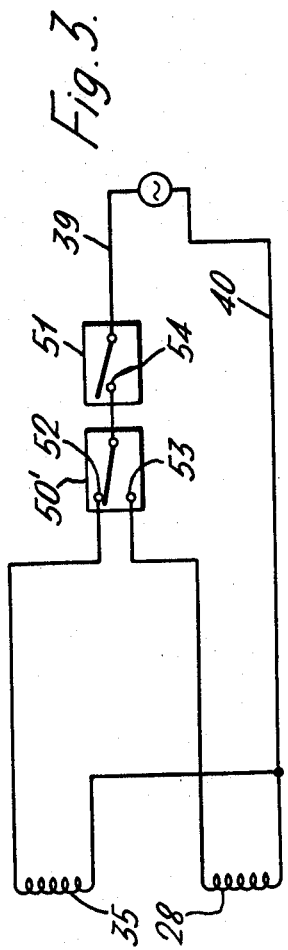
FIG. 3 is a diagram of a different electrical control circuit.

In FIG. 3, a pair of switches 50' and 51 are provided to control the energization of the coils 28 and 35 of the electromagnetic valves 21 and 22. Both switches are actuated by a common pedal, not shown. The switch 50' has a normally closed contact 52 and a normally open contact 53. The contacts 52 and 53 are connected to one end of the coils 35 and 28, respectively. The opposite end of each coil is connected to one of the supply lines 39 and 40. The other switch 51 is provided with a contact 54 and a locking means (not shown) such that every step of the switch causes the contact 54, when open or closed, to be closed or opened. When both switches 50' and 51 are first stepped on, the contacts 53 and 54 are closed to energize the coil 28, so that the shaft 2 is rotated in the normal direction. Under this condition, when the step on the pedal is released, the contact 52 is closed, but the contact 54 is locked in a closed position, so that the coil 35 of the electromagnetic valve 22 is energized, and the inertial rotation of the shaft 2 is prevented in the previously described manner. When the pedal is stepped on for the second time, the contact 54 is opened to deenergize the coil 35. It will be seen that after the step on the pedal is released, compressed air is continuously supplied through the exhaust passage until the pedal is again stepped on.

Having illustrated and described preferred embodiments of the invention, there are many changes and modifications thereof within the scope of the invention as defined in the appended claim.

What I claim is:

1. A gas bearing device for a dental handpiece having a rotatable shaft for holding a dental tool for rotation therewith and a plurality of turbine blades provided on said shaft, comprising means for defining a gap around the outer circumferential surface of at least a portion of said shaft; first passage means open at one end toward the front surfaces of the turbine blades and connectable at the other end alternatively to a source of compressed air and atmosphere; second passage means open at one end toward the rear surfaces of the turbine blades and connectable at the other end alternatively to the source of compressed air and atmosphere; third passage means connecting said gap to the first and second passage means; a first three-way electromagnetic valve connected to the first passage means and operable in a first condition to connect the first passage means to the source of compressed air and in a second condition to connect the first passage means to atmosphere; a second three-way electromagnetic valve connected to the second passage means and operable in a first condition to connect the second passage means to the source of compressed air and in a second condition to connect the second passage means to atmosphere; means for switching said first and second valves between their respective first and second conditions; and means for effecting the first condition of said second valve for a predetermined period of time after said first valve has been switched from its first to its second condition.

References Cited

UNITED STATES PATENTS

| | | | |
|---|---|---|---|
| 2,763,461 | 9/1956 | Hill | 253—3 |
| 3,046,585 | 7/1962 | Ledingham et al. | 253—51 X |
| 3,231,237 | 1/1966 | Wernström | 253—3 |
| 3,268,205 | 8/1966 | Allen et al. | 253—2 |
| 3,270,417 | 9/1966 | Stram | 253—2 X |

EVERETTE A. POWELL, JR., *Primary Examiner.*